United States Patent
Xi et al.

(10) Patent No.: US 9,575,307 B2
(45) Date of Patent: Feb. 21, 2017

(54) NON-VECTOR SPACE SENSING AND CONTROL SYSTEMS AND METHODS FOR VIDEO RATE IMAGING AND MANIPULATION

(71) Applicant: Board of Trustees of Michigan State University, East Lansing, MI (US)

(72) Inventors: Ning Xi, Okemos, MI (US); Bo Song, East Lansing, MI (US); Jianguo Zhao, East Lansing, MI (US); Wai Chiu King Lai, East Lansing, MI (US)

(73) Assignee: Board of Trustees of Michigan State University, East Lansing, MI (US)

( * ) Notice: Subject to any disclaimer, the term of this patent is extended or adjusted under 35 U.S.C. 154(b) by 215 days.

(21) Appl. No.: 14/384,608

(22) PCT Filed: Mar. 15, 2013

(86) PCT No.: PCT/US2013/032140
§ 371 (c)(1),
(2) Date: Sep. 11, 2014

(87) PCT Pub. No.: WO2013/148320
PCT Pub. Date: Oct. 3, 2013

(65) Prior Publication Data
US 2015/0042781 A1    Feb. 12, 2015

Related U.S. Application Data

(60) Provisional application No. 61/617,155, filed on Mar. 29, 2012.

(51) Int. Cl.
*G02B 21/36*    (2006.01)
*B82Y 35/00*    (2011.01)
(Continued)

(52) U.S. Cl.
CPC ............ *G02B 21/365* (2013.01); *B82Y 35/00* (2013.01); *G01Q 10/06* (2013.01); *G01Q 30/04* (2013.01); *G06T 1/0007* (2013.01); *G06T 1/0014* (2013.01)

(58) Field of Classification Search
CPC .................................................. G02B 21/365
(Continued)

(56) References Cited

U.S. PATENT DOCUMENTS 5,204,531 A * 4/1993 Elings .................... B82Y 35/00
                                                      250/307
5,825,670 A   10/1998 Chernoff et al.
(Continued)

FOREIGN PATENT DOCUMENTS

| JP | H10246728 A | 9/1998 |
| WO | WO-0225934 A2 | 3/2002 |
| WO | WO-2007089365 A2 | 8/2007 |

OTHER PUBLICATIONS

R. Barrett "Optical Scan-Correction System Applied to AFM", Rev. Sci. Instrum. 62, 1393 (1991).
(Continued)

*Primary Examiner* — Christopher S Kelley
*Assistant Examiner* — Asmamaw G Tarko
(74) *Attorney, Agent, or Firm* — Harness, Dickey & Pierce, P.L.C.

(57) ABSTRACT

Compressive sensing based video rate imaging techniques are presented. Rather than scan the entire image, the imaging system only scans part of the topography of the sample as a compressed scan. After the data has been collected, an algorithm for image reconstruction is applied for recovering the image. Because compressive sensing is used, the imaging rate is increased from several minutes per frame to seconds per frame. Non-vector space control techniques are
(Continued)

also presented. No-vector space control use image or compressive data as the input and feedback to generate a closed-loop motion control. Compressive sensing technique provides an efficient data reduction method to retain the essential information in the original image. The non-vector space control method can be used as motion control method with compressive feedback without or with noise.

33 Claims, 11 Drawing Sheets

(51) Int. Cl.
*G01Q 10/06* (2010.01)
*G01Q 30/04* (2010.01)
*G06T 1/00* (2006.01)

(58) Field of Classification Search
USPC .......................................................... 348/79
See application file for complete search history.

(56) References Cited

U.S. PATENT DOCUMENTS

| | | | |
|---|---|---|---|
| 5,866,806 A | 2/1999 | Samsavar et al. | |
| 6,032,518 A | 3/2000 | Prater et al. | |
| 6,314,212 B1 | 11/2001 | Womack et al. | |
| 6,763,322 B2 | 7/2004 | Potyrailo et al. | |
| 6,931,917 B2 | 8/2005 | McWaid et al. | |
| 7,084,384 B2 | 8/2006 | Proksch et al. | |
| 7,143,005 B2 | 11/2006 | Dahlen et al. | |
| 7,334,460 B2* | 2/2008 | Chand | G01B 5/28 73/105 |
| 7,421,370 B2 | 9/2008 | Jain et al. | |
| 7,441,444 B2 | 10/2008 | Hoh | |
| 7,639,365 B2 | 12/2009 | Herring | |
| 7,770,231 B2 | 8/2010 | Prater et al. | |
| 7,941,286 B2 | 5/2011 | Proksch et al. | |
| 2008/0181355 A1* | 7/2008 | Hemmendorff | A61B 6/502 378/4 |
| 2008/0277582 A1 | 11/2008 | Shi et al. | |
| 2009/0007094 A1 | 1/2009 | Hinton et al. | |
| 2010/0235956 A1 | 9/2010 | Liu et al. | |
| 2010/0294927 A1 | 11/2010 | Nelson et al. | |
| 2013/0162457 A1* | 6/2013 | Gangopadhyay | H03M 1/38 341/161 |

OTHER PUBLICATIONS

P. Binev, et al "Compressed Sensing and Electron Microscopy", Aachen Institute for Advanced Study in Computational Engineering Science, Preprint: AICES—Jan. 10, 2011 (Jan. 10, 2011).

W. Pierce "Imaging on the Nanoscale", University of Manchester School of Computer Science Project Report (2009).

S. Anderson et al "Tip Steering for Fast Imaging in AFM", 2005 American Control Conference, Portland, OR (2005).

G. Schitter et al., "Scanning Probe Microscopy at Video-Rate", Materialstoday, Microscopy Special Issue (2008).

\* cited by examiner

FIG. 5

NON-VECTOR SPACE SENSING AND CONTROL SYSTEMS AND METHODS FOR VIDEO RATE IMAGING AND MANIPULATION

CROSS-REFERENCE TO RELATED APPLICATIONS

This application is a U.S. National Phase Application under 35 U.S.C. 371 of International Application No. PCT/US2013/032140 filed on Mar. 15, 2013 and published as WO 2013/148320 on Oct. 3, 2013. This application claims the benefit of U.S. Provisional Application No. 61/617,155, filed on Mar. 29, 2012. The entire disclosures of the above applications are incorporated herein by reference.

GOVERNMENT CLAUSE

This invention was made with government support under N00014-10-1-0786 awarded by the Office of Naval Research. The government has certain rights in the invention.

FIELD

The present application relates to systems and methods involving visual servoing and more particularly to image-based control systems and scanning microscopy.

BACKGROUND

Visual servoing involves using visual information to control a system to move from an initial position to a desired position. This may be accomplished by moving an imaging device such that the image produced by the imaging device converges to a predefined desired image. This method requires extraction and tracking of geometric features in the image. Example features include points, lines, image moments, etc. In reality, reliable feature extraction and tracking is difficult. In fact, it is one of the most difficult problems in computer-based vision. Thus, there is a need for direct visual servoing that does not involve extraction and tracking.

Scanning (probe) microscopy has been playing an important role in the research and development of nanotechnology. Nanotechnology refers to the study of matter on an atomic and/or molecular scale. Structures that fall within the realm of nanotechnology generally have one or more dimensions that are between one and one-hundred nanometers.

One type of scanning microscopy is atomic force microscopy (AFM). AFM may also be referred to as scanning force microscopy (SFM). Another type of scanning microscopy that is a predecessor to AFM is scanning tunneling microscopy. Other types of scanning microscopy include, but are not limited to, scanning electron microscopy and transmission electron microscopy.

In AFM, a probe having a tip is suspended at the end of a cantilever. The tip is generally moved (scanned) over the entire surface of a subject. Forces between the tip and the subject cause the tip to move toward or away from the surface of the subject. Based on signals received from the probe by the AFM system, an image of the surface of the subject can be generated and displayed.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

In one aspect of this disclosure, a method is presented for producing video rate images of a subject. The method includes: moving a tip of a scanning probe microscopy over an area of the subject; generating a first signal based on a position of the tip during the movement; selectively sampling the first signal during the movement; and generating a first image of the area of the subject using the samples taken during the movement of the tip over the area of the subject. The method also includes moving the tip over part of the area of the subject at a rate that corresponds to producing video rate images. Movement of the tip over part of the area of the subject is performed following a predetermined scanning pattern. The method also includes: generating a second signal based on the position of the tip during the movement over part of the area of the subject; selectively sampling the second signal generated during the movement of the tip over part of the area of the subject; generating a second image of the area of the subject using the samples taken during the movement of the tip over part of the area of the subject; and displaying the second image.

In another aspect, a method of producing video rate images includes: moving a tip of a scanning probe microscopy over an area of the subject; generating a first image of the area of the subject based on a first set of samples of a height of the tip during the movement over the area of the subject; moving the tip over part of the area of the subject at a rate that corresponds to producing video rate images. The movement of the tip over part of the area of the subject is performed following a scanning pattern or random scanning pattern. The method also includes generating a second image of the area of the subject; and displaying the second image on a display. The second image is generated based on: a second set of samples of the height of the tip during the movement over part of the area of the subject; the first image; the predetermined scanning pattern; and a reconstruction function.

In other aspects, a system is presented for producing video rate images of a subject. The system includes: a control module, an imaging module, and a user interface module. The control module drives movement of a tip of a scanning probe microscopy over an area of the subject and, after the movement of the tip over the area of the subject, drives movement of the tip over part of the area of the subject at a rate that corresponds to producing video rate images. The control module drives movement of the tip over part of the area of the subject following a predetermined scanning pattern. The imaging module generates a first image of the area of the subject based on a first set of samples of a height of the tip during the movement over the area of the subject and generates a second image of the area of the subject based on: a second set of samples of the height of the tip during the movement over part of the area of the subject; the first image; the predetermined scanning pattern; and a reconstruction function. The user interface module displays the second image on a display.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIG. 5 is an example illustration for compressive sensing according to the present disclosure;

Figure 1:
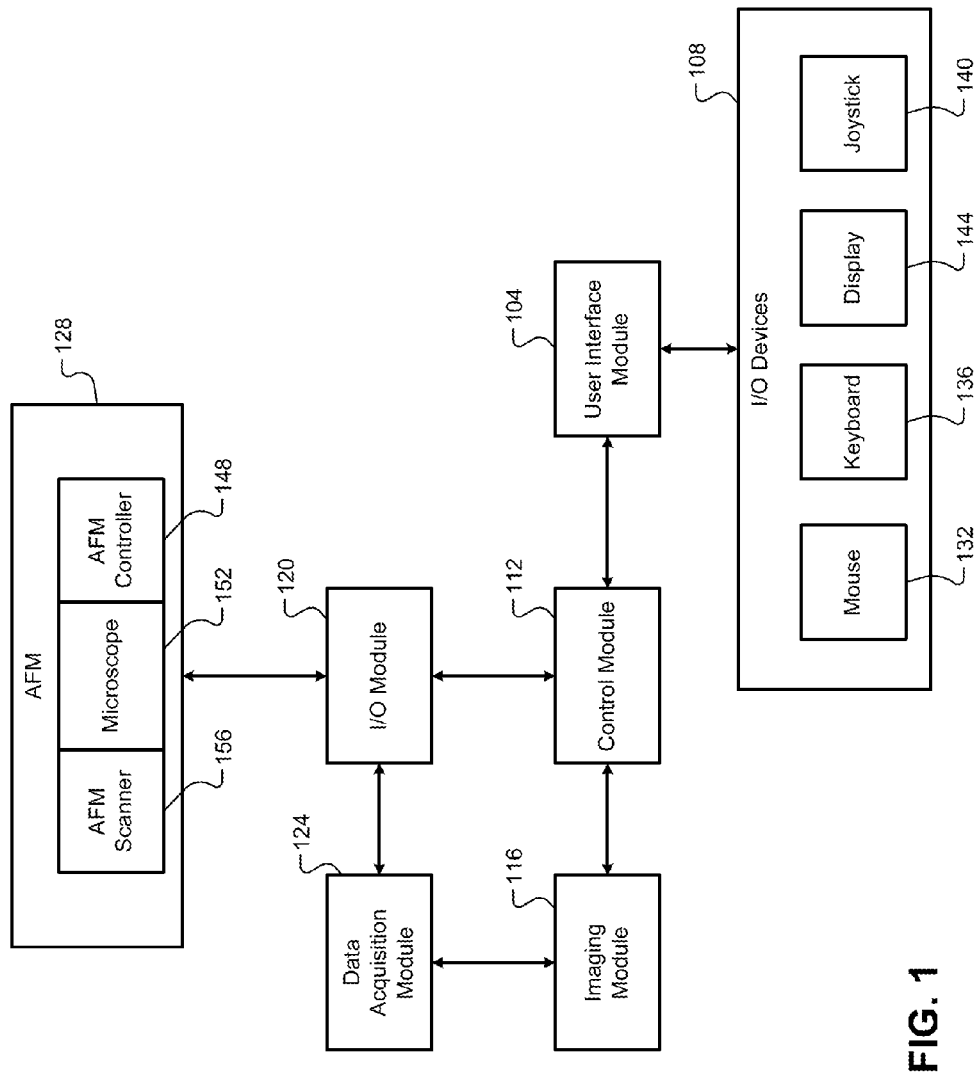
FIG. 1 is a functional block diagram of an example atomic force microscopy (AFM) system according to the present disclosure.

The drawings described herein are for illustrative purposes only of selected embodiments and not all possible implementations, and are not intended to limit the scope of the present disclosure. Corresponding reference numerals indicate corresponding parts throughout the several views of the drawings.

DETAILED DESCRIPTION

Referring now to FIG. 1, a functional block diagram of an example scanning probe microscopy system is presented. While the present disclosure will be discussed in terms of an atomic force microscopy (AFM) system, the present disclosure is also applicable to other types of scanning probe microscopy including, but not limited to, scanning electron microscopy and transmission electron microscopy.

The AFM system includes a user interface module 104, input/output (I/O) devices 108, a control module 112, an imaging module 116, an I/O module 120, a data acquisition module 124, and an AFM microscope 128. The I/O devices 108 include one or more input devices, such as a mouse/pointer device 132, a keyboard 136, and a joystick 140. The I/O devices 108 also include one or more output devices, such as a display 144. In various implementations, the display 144 may be a touch screen display and be both an output device and an input device.

The AFM microscope 128 may include an AFM controller 148, an optical microscope 152, and an AFM scanner 156. The AFM microscope 128 includes a probe. A user can position a subject in the optical microscope 152 under a tip of the probe. The tip of the probe is positioned in close proximity to a surface of the subject such that forces actuate the probe toward and away from the surface of the subject. The AFM scanner 156 generates a signal based on position of the probe relative to the surface of the subject. A laser source is projected onto the probe, and the AFM scanner 156 may generate the position control signal based on reflected laser which represents the deformation of AFM probe. In some embodiments, the optical microscope 152 may be substituted by a camera.

The AFM controller 148 selectively moves probe based a control signal (u(t)) from the control module 112. For example only, the AFM controller 148 may include one or more piezoelectric drivers. The control signal is generated to achieve video rate imaging of the subject. Video rate imaging may refer to continuous streams of images such that a human can observe motion of the subject continuously and may reach one frame per second which is considerably faster than conventional AFM. While the AFM controller 148 will be discussed as moving the probe, the probe may instead be stationary, and the AFM controller 148 may move the subject based on the control signal. Based on the topography of the subject, the AFM controller 148 may also adjust a height of the probe to maintain approximately a constant distance between the surface of the subject and the probe.

The I/O module 120 may communicate signals to the AFM controller 148 for movement of the probe based on the control signal from the control module 112. The control module 112 (e.g., see FIG. 2) generates the control signal such that the probe moves at a desired speed along a desired pattern so that compressive sensing (scanning) of the subject and video rate imaging of the subject can be performed. Compressive sensing of the subject facilitates video rate imaging as, in compressive sensing, less than the entire surface of a subject is scanned for generation (i.e., reconstruction) of an image of the scanned area.

The imaging module 116 (e.g., see FIG. 4) uses compressive sensing and generates an image of an area of the subject based on the signals generated by the AFM scanner 156. The signals from the AFM scanner 156 may be communicated to the imaging module 116 by the I/O module 120 and the data acquisition module 124. The I/O module 120 and/or the data acquisition module 124 may condition the signals output by the AFM scanner 156 in one or more ways for use by the imaging module 116. For example only, the data acquisition module 124 may digitize the signal generated by the AFM scanner 156.

In various implementations, the imaging module 116 may be implemented within a first computer, the control module 112 may be implemented within a second computer, and the user interface module 104 may be implemented within a third computer. In other implementations, the imaging module 116, the control module 112, and the user interface module 104 may be implemented within a greater or fewer number of computers and/or other type of micro controllers such as FPGA and DSP.

Figure 2:
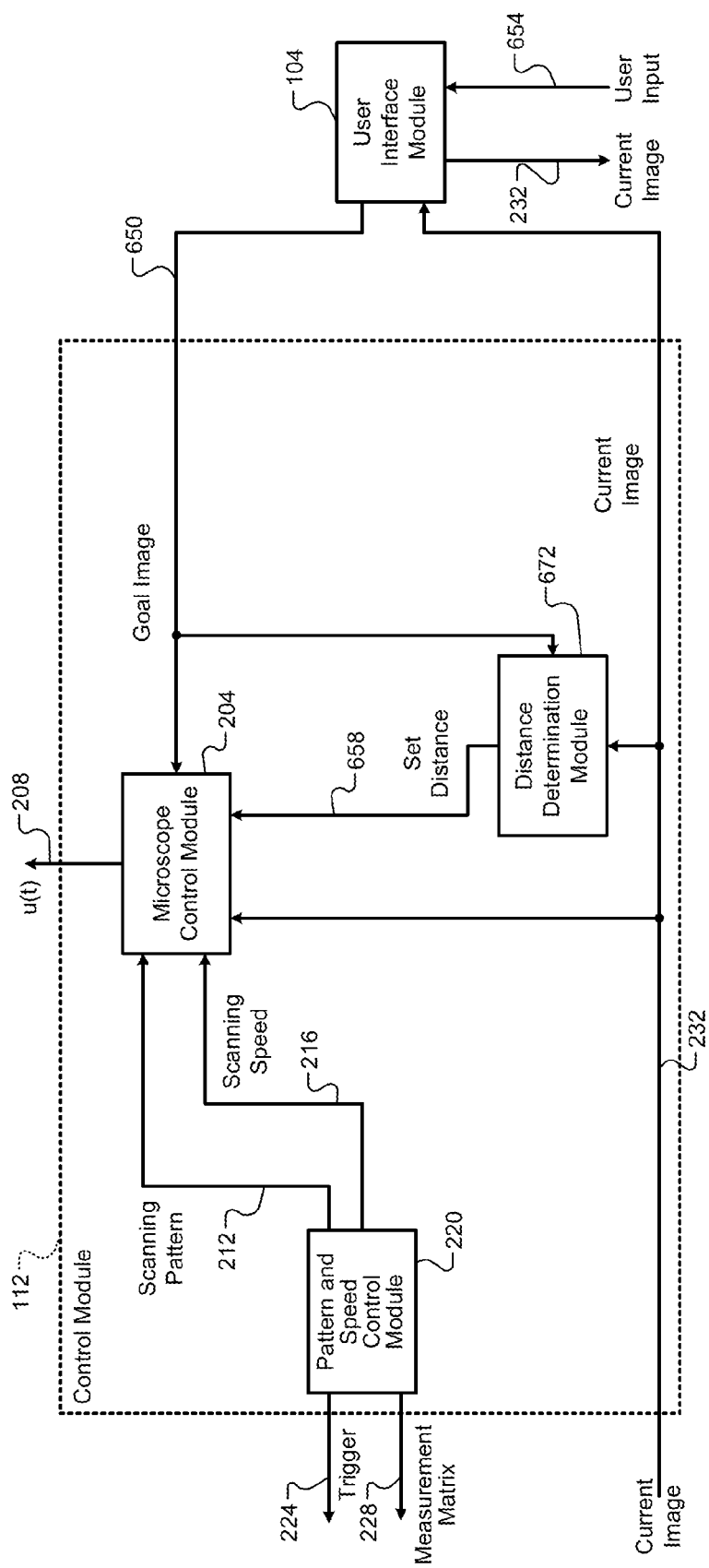
FIG. 2 is a functional block diagram of an example of a control module according to the present disclosure.

Referring now to FIG. 2, a functional block diagram of an example implementation of the control module 112 is presented. A microscope control module 204 generates the control signal (u(t)) 208 such that the AFM controller 148 uses the (AFM) probe to scan an area of the subject following a scanning pattern 212 at a scanning speed 216. Examples of the scanning pattern 212 are presented in FIGS. 3A, 3B, 3C, and 3D.

A pattern and speed control module 220 may set the scanning pattern 212 and the scanning speed 216. The pattern and speed control module 220 may set the scanning pattern 212, for example, to one of the example scanning patterns. The pattern and speed control module 220 may selectively change the scanning pattern 212 to a different one of the example patterns during scanning. The pattern and speed control module 220 may set the scanning speed 216, for example, based on the scanning pattern 212 and a size of the area of the subject to be scanned. The scanning speed 216 is sufficient to generate video rate images.

Figure 3A:
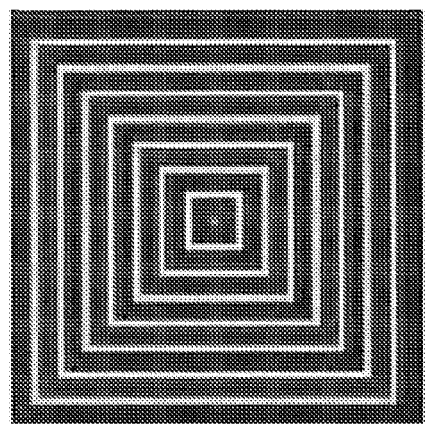
FIGS. 3A-3D are illustrations of example scanning patterns for compressive sensing according to the present disclosure.
Figure 3B:
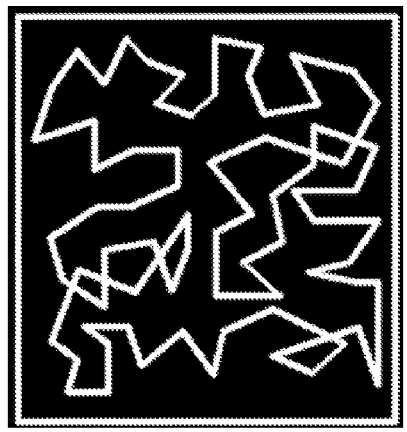
Figure 3C:
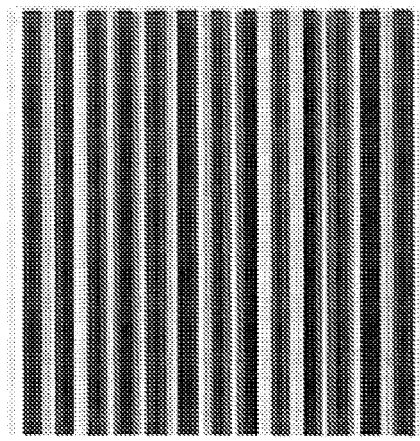
Figure 3D:
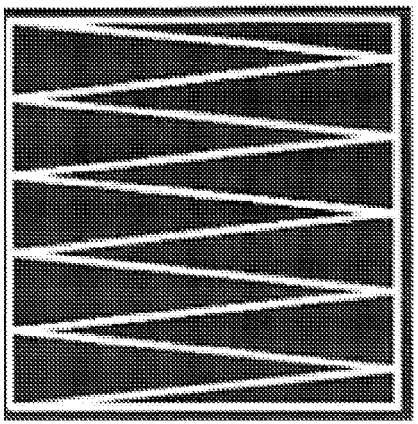

The scanning pattern 212 is designed for use in compressive sensing and does not involve scanning the entire area of the subject. Instead, the scanning pattern 212 is designed such that the area of the subject is scanned only partially (e.g., see the white portions of the example scanning patterns) as to save time scanning the area of the subject. The scanning pattern 212 is designed to have stable and uniform image reconstruction performance in both the horizontal and vertical directions. For example only, as in the example of FIG. 3A, the scanning pattern 212 may include equally spaced horizontal or vertical lines. For example only, while not shown, the scanning pattern 212 may include equally spaced vertical lines. For another example only, as in the example of FIG. 3B, the scanning pattern 212 may include concentric rectangles. For another example only, as in the example of FIG. 3C, the scanning pattern 212 may include a sawtooth pattern. In other embodiments, the scanning pattern 212 may be a random scan pattern as shown in FIG. 3D. The random scan pattern has a larger probability to cover the objects in an imaging area and that may guarantee the image can be well recovered as further discussed below.

The pattern and speed control module 220 may output a sample trigger 224 and a measurement matrix 228 to the imaging module 116 for performing compressive sensing. The pattern and speed control module 220 triggers the imaging module 117 via the sample signal 224 periodically during scanning of the area of the subject. The pattern and speed control module 220 may trigger the imaging module 117, for example, based on the scanning speed 216, the scanning pattern 212, and the size of the area to be scanned. The imaging module 116 samples the signal generated by the AFM scanner 156 when triggered via the sample trigger 224.

Based on the samples of the signal taken during one iteration of the scanning pattern 212 and the measurement matrix 228, the imaging module 116 reconstructs a current image 232 of the area scanned. The user interface module 104 then displays/updates the current image 232 of the area scanned on the display 144. The measurement matrix 228 is set based on the scanning pattern 212.

Figure 4:
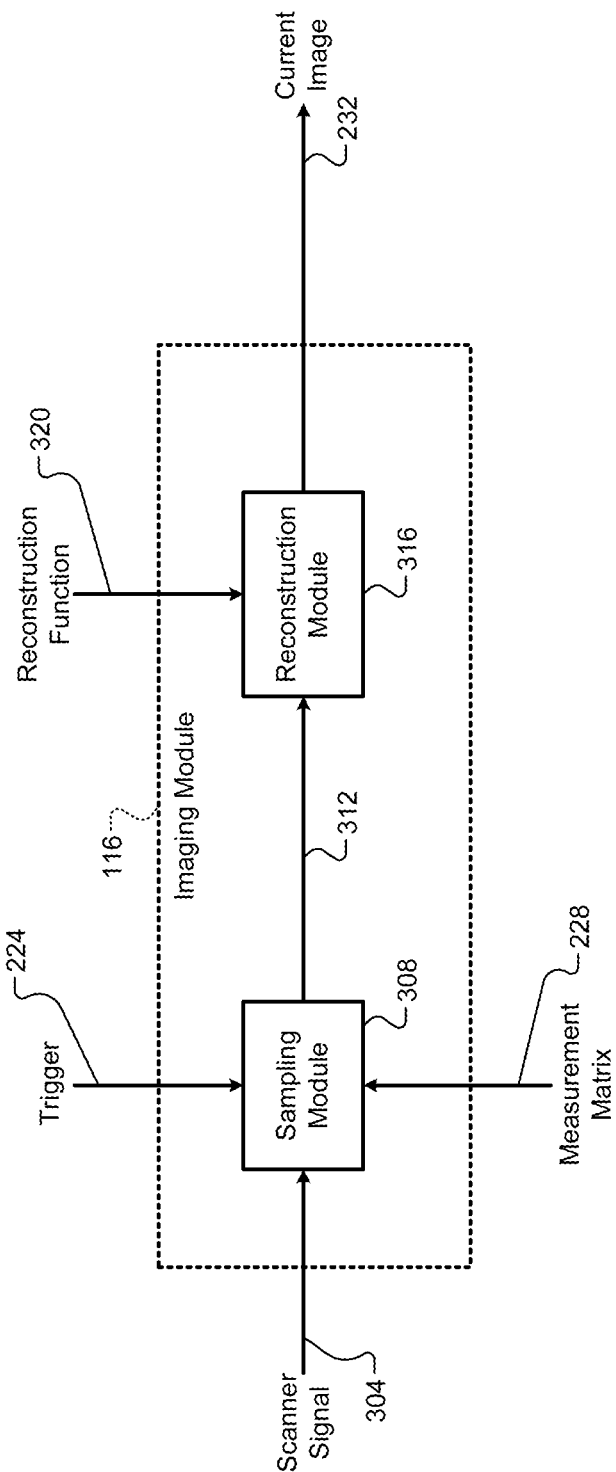
FIG. 4 is a functional block diagram of an example of an imaging module according to the present disclosure.

Referring now to FIG. 4, a functional block diagram of an example implementation of the imaging module 116 is presented. As stated above, the imaging module 116 uses compressive sensing for reconstruction and generation of the current image 232 of the area of the subject that is scanned using the scanning pattern 212. In some embodiments, the entire area of the subject is first scanned before compressive sensing. In other embodiments, compressive sensing can proceed without scanning the entire are first. Compressive sensing may also be referred to as compressed sensing, compressive sampling, and sparse sampling.

Compressive sensing is a way to find sparse solutions to underdetermined linear systems. Compressive sensing involves acquiring and reconstructing a signal that is sparse into a usable signal. A signal can be referred to as being sparse, for example, when most of its elements are zero or approximately zero (such that they could be considered zero based on their magnitude relative to non-zero elements).

Figure 5:
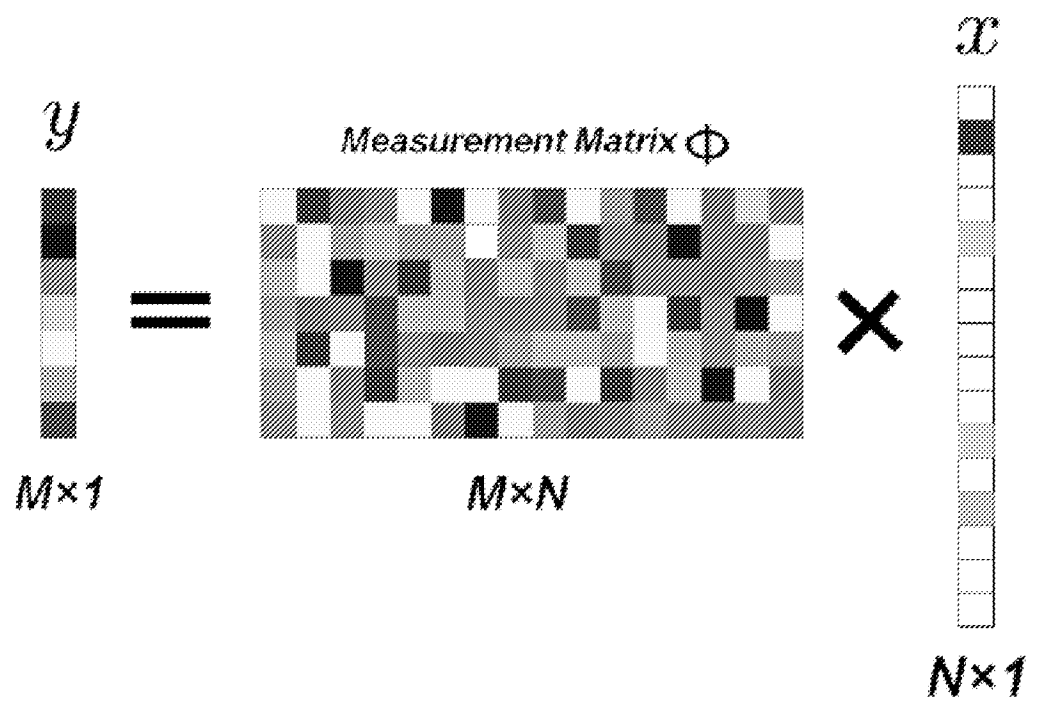

FIG. 5 includes an example illustration that can be used to help illustrate the process of compressive sensing. Referring now to FIG. 5, consider, for example, an unknown signal or image X having a dimension of N×1. If M linear measurements are taken of the signal X and M is equal to N, the original signal X can be perfectly reconstructed using linear algebra. However, if M is less than N, i.e., a fewer number of samples are taken (as in compressive sensing using the scanning pattern 212), a representation Y of the original signal X can be obtained using the equation:

$$y = \Phi x, \quad (1)$$

where $\Phi$ is the measurement matrix. From equation (1), each one of the M measurements is a sum of the linear projections from original signal X to the measurement result Y through the measurement matrix $\Phi$. This is an underdetermined equation, and it may be difficult or impossible to find the solution.

However, if constraints were added, such as that the original signal X is sparse and that the measurement matrix is properly designed based on the original signal X being sparse (as is the case in the present application), an optimized solution for original signal X can be found by solving the following 0-norm equation:

$$\tilde{x} = \arg\min \|x\|_0 \text{ s.t. } \Phi x = y. \quad (2)$$

Alternatively, the following 1-norm equation could be used:

$$\tilde{x} = \arg\min \|x\|_1 \text{ s.t. } \Phi x = y. \quad (3)$$

Most signals are not naturally sparse in the time domain and thus cannot immediately be used in compressive sensing. Non-sparse signals can be made sparse using, for example, Fourier, wavelet, curvelet, or another suitable transform, which can be represented by:

$$x = \Psi s, \quad (4)$$

where s is the sparse representation (coefficient) of signal X in basis $\psi$. Equation 1, above, could then be rewritten as:

$$y = \Psi \Phi s; \text{ or} \quad (5)$$

$$y = \tilde{\Phi} x, \quad (6)$$

where $\tilde{\Phi}$ is a new measurement matrix. Therefore, $$\tilde{s} = \arg\min \|s\|_1 \text{ s.t. } \phi \Psi s = y. \quad (7)$$

If the original signal x is already sparse, the basis $\psi = I$.

Referring back to FIG. 4, a sampling module 308 samples the signal 304 generated using the AFM scanner 156 when triggered via the sample trigger 224. The sampling module 308 provides the samples 312 to a reconstruction module 316.

Using a reconstruction function 320, the reconstruction module 316 reconstructs the samples 312 taken during one iteration of the scanning pattern 212 to generate the current image 232 (i.e., reconstruct the current image 232). The reconstruction function 320 may be, for example, a minimization total variation norm (TV-norm) algorithm/function, which can be expressed as:

$$\hat{x} = \arg\min \text{TV}(x) \text{ s.t. } \Phi x = y,$$

where $$\text{TV}(x) = \Sigma_{i,j} \sqrt{(x_{i+1,j})^2 + (x_{i,j+1} - x_{i,j})^2}. \quad (8)$$

Other example reconstruction algorithms/functions include basis pursuit, Danzig selector, and Lasso algorithms/functions.

Figure 6:
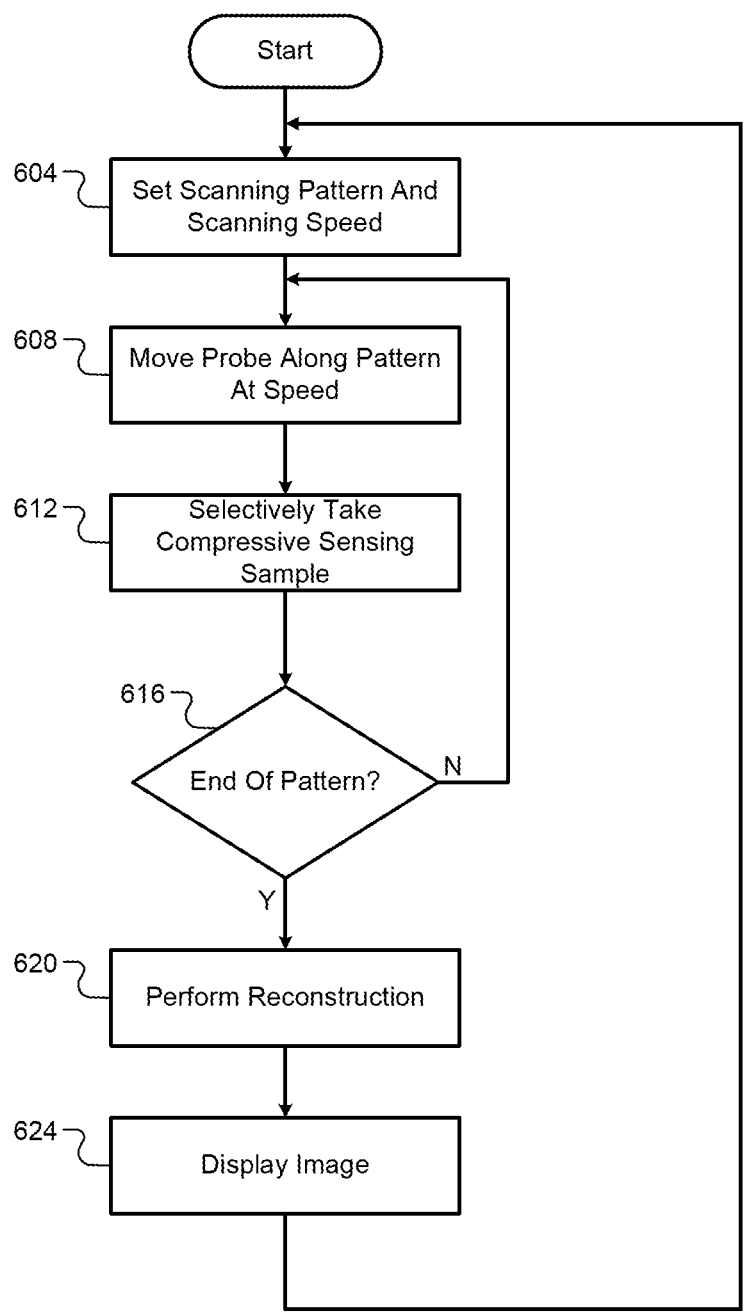
FIG. 6 is a flowchart depicting an example method of generating an image of an area of a sample using compressive sensing according to the present disclosure.

Referring now to FIG. 6, a flowchart depicting an example method of performing compressive sensing to generate an image of an area of a subject is presented. Control may begin with 604 where control sets the scanning pattern 212 for scanning (part of) the area of the subject and sets the scanning speed 216 for moving the probe along the scanning pattern 212. At 608, control scans the probe along the scanning pattern 212 at the scanning speed 216.

Control selectively samples the signal generated using the AFM scanner 156 at 612. At 616, control determines whether the iteration of the scanning pattern 212 has been completed. In other words, control determines whether the area of the subject has been scanned according to the scanning pattern 212 at 616. If true, control may continue with 620. If false, control may return to 608 and continue to follow the scanning pattern 212 at the scanning speed 216 and sample the signal generated using the AFM scanner 156.

At 620, control executes the reconstruction function 320 based on the samples generated as the area of the subject was scanned following the scanning pattern 212 to generate the current image 232 of the area of the subject. At 624, control displays the current image 232 on the display 144, and control returns to 604. Control repeats 604-624 at least a predetermined rate to execute video rate imaging. Control generates the current image 232.

Referring back to FIG. 2, the microscope control module 204 also generates the control signal 208 to perform visual servoing. More specifically, the microscope control module 204 generates the control signal to achieve a goal image 650 using the current image 232 as feedback to control movement of the probe in closed-loop.

The user interface module 104 may generate the goal image 650 based on user input 654. For example, the user may select a desired location on a displayed image of the subject, and the user interface module 104 may generate the goal image 650 based on the desired location. For example, the user interface module 104 may generate the goal image 650 based on an area of the displayed image that is centered at the desired location. The size of the area may be set, for example, based on the user input 654, a desired level of magnification, a predetermined area, and/or one or more other suitable parameters.

Precise control of the position of the probe is important for manipulation and observation in nanotechnology. In conjunction with the non-vector space sensing and control (NVSC) systems and methods described herein, the (tip of the) probe can be considered a single pixel image sensor with two translational degrees of freedom, and the current image 232 can be generated by moving the probe on the surface of the subject using the scanning pattern 212.

Figure 7B:
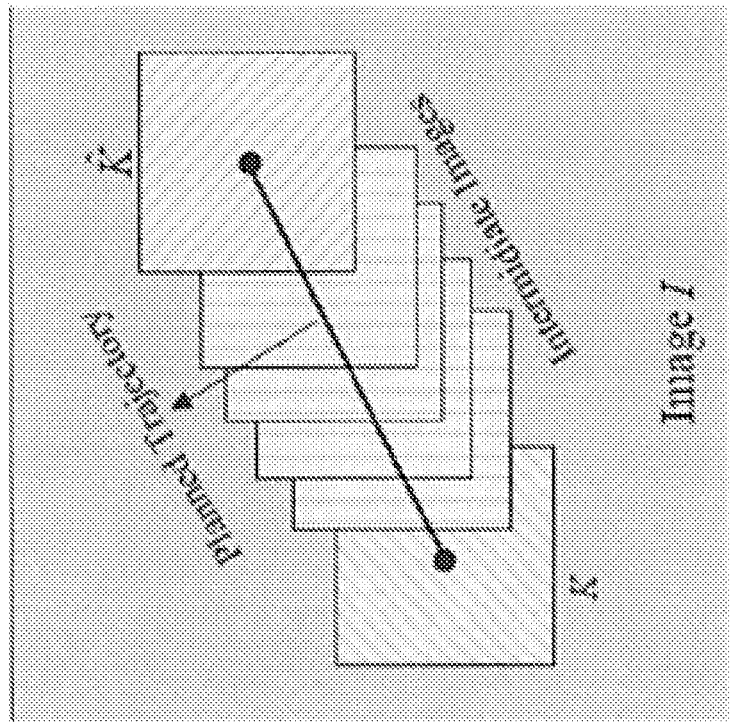
FIGS. 7A-7B are example illustrations of visual servoing using compressive sensing according to the present disclosure.
Figure 7A:
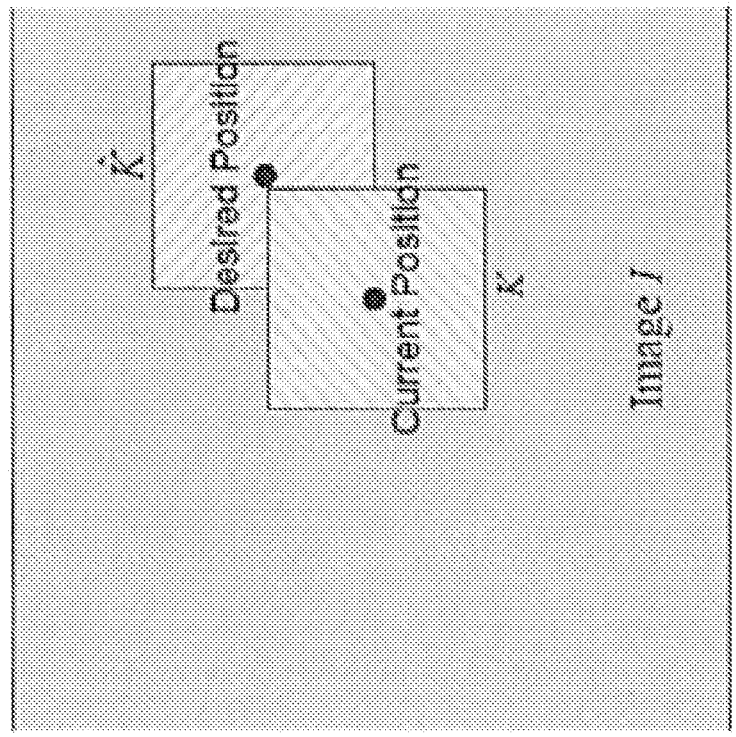

Based on the above, movement of the probe from its current location to a desired location can be said to fall into one of two cases: (i) a first case where the current location is sufficiently close to the desired location; and (ii) a second case where the current location is not sufficiently close to the desired location. The current location may be deemed sufficiently close to the desired location, for example, when a distance between the current and desired locations is less than or equal to a predetermined distance. An example illustration of this case is presented in FIG. 7A. Conversely, the current location may not be sufficiently close to the desired location when the distance is greater than the predetermined distance. If the current location is not sufficiently close to the desired location, one or more intermediate (goal) images may be determined where the current location is sufficiently close to a location in the center of a first one of the intermediate images, the center locations of each of the intermediate images are sufficiently close, the center location of a last one of the intermediate images is sufficiently close to the desired location, and the center locations of the intermediate images follow a planned trajectory between the current location and the desired location. An example illustration of this case is presented in FIG. 7B.

As the current and goal images 232 and 650 are used in controlling the movement of the probe, a traditional vector space distance is not used. Instead, a Set distance 658 is used, and the microscope control module 204 generates the control signal 208 to adjust the Set distance 658 to less than a threshold value. A distance determination module 672 determines the Set distance 658 based on the current and goal images 232 and 650.

The Set distance 658 may refer to the distance d(X),Y) between two different sets or images X and Y that satisfy the following three conditions:
 (a) Non-negative: d(X,Y)>0 if X is not the same as Y;
 (b) Symmetry: d(X,Y)=d(Y,X); and
 (c) Triangular inequality: D(X,Y)<=D(X,Z)+D(Z,Y) for any other set Z. The Set distance 658 forms a metric in the space of sets.

Here, a Hausdorff distance (dH) will be described as an example of a set distance. While reference is made to a Hausdorff distance, it is understood that other distances such as a partial Hausdorff distance or a modified Hausforff distance also fall with the scope of this disclosure. That is, other measures for how far two subsets of a metric space are from each other can be employed.

Determination of a Hausdorff distance will be described step by step. First, the distance between a point $x \in R^n$ and a set $K \subset R^n$ is defined as:

$$d_K(x) \inf_{y \in K} \|y-x\|, \tag{9}$$

where $\|\bullet\|$ is the Euclidean distance between two points. The projection of x to K is the set of points $y \in K$ defined by:

$$\Pi_K(x) = \{y \in K : \|y-x\| = d_K(x)\}. \tag{10}$$

The distance from set X to set Y is defined as:

$$d(X,Y) = \sup_{x \in X} d_Y(x), \text{ and} \tag{11}$$

the distance from set Y to set X is defined as:

$$d(Y,X) = \sup_{y \in Y} d_X(y) \tag{12}$$

Generally, the distance from set X to set Y will not be equal to the distance from set Y to set X and, thus, will not form a metric. However, the Hausdorff distance is a metric and is defined as:

$$dh(X,Y) = \max\{d(X,Y), d(Y,X)\} \tag{13}$$

In other words, the Hausdorff distance is defined as the greater one of: the distance from set X to set Y; and the distance from set Y to set X.

As stated above, images are used. Grey scale images can be considered three dimensional sets because each pixel of a grey scale image has two pixel index values and one intensity value. Therefore, the Hausdorff distance between two grey scale images X and Y is:

$$dh(X,Y) = \max\left\{\max_{x \in X} \min_{y \in Y} \|x-y\|, \max_{y \in Y} \min_{x \in X} \|y-x\|\right\}, \tag{14}$$

where x, y∈$N^3$ are vectors formed by three natural numbers. Note that the index values and intensity have different values. As such, the index values should be properly scaled as to have the same range as the intensities.

The microscope control module 204 generates the control signal 208 to drive the Set distance 658 distance to less than a threshold value, thereby moving the probe to the desired location and achieving the goal image 650. The threshold value may be approximately zero. With a goal image set $\hat{K}$ and an initial current image set K(0), the microscope control module 204 can set the control signal (u(t)) 208 using the equation:

$$u(t)=\gamma(K(t)) \quad (15)$$

based on current images so that $$dh(K(t),\hat{K}) \to 0 \text{ as } t \to \infty. \quad (16)$$

Letting x(t) be the trajectory for an individual pixel in an image, $$x=[x_1,x_2,x_3]^T, \quad (17)$$

where $x_1$ and $x_2$ represent the pixel position and $x_3$ is the intensity of the pixel. If a kinematic model is considered, the control signal u(t) 208 will be or correspond to the spatial velocity of the probe and includes three linear velocity components (v) and three angular velocity components (ω) and can be expressed as:

$$u(t)=[v_x,v_y,v_z,\omega_x,\omega_y,\omega_z]^T. \quad (18)$$

Under invariant lighting conditions, the projection of a three-dimensional point onto the image plane will have a constant intensity value. Therefore, $x_3=0$ under invariant lighting conditions. If the AFM scanner 156 is calibrated, then with a perspective projection model, any point in the image plane with coordinates $x_1$ and $x_2$ is related to the corresponding three-dimensional point by the perspective projection. If the focal length is assumed to be unit length:

$$x(t) = Lu(t), \quad (19)$$

where $$L = \begin{bmatrix} 1/p_z & 0 & x_1/p_z & x_1x_2 & -(1+x_1^2) & x_2 \\ 0 & 1/p_z & x_2/p_z & 1+x_2^2 & -x_1x_2 & -x_1 \\ 0 & 0 & 0 & 0 & 0 & 0 \end{bmatrix}, \quad (20)$$

and where $p_z$ is depth (height). If the depth $p_z$ is assumed to be constant, then L depends only on x. Therefore, the controlled mutation equation is:

$$L(X(t))u(t) \in K(t). \quad (21)$$

Based on the Lyapunov function candidate:

$$V(K)=\int_K d_{\hat{K}}^2(x)dx+\int_{\hat{K}} d_K^2(x)dx, \quad (22)$$

the microscope control module 204 may generate the control signal 208 (u(t)) and locally exponentially stabilize it at $\hat{K}$ using the equation:

$$u(t)=\gamma(K(t))=-\lambda A(K)^+ V(K) \quad (23)$$

for the system L(X(t))u(t)∈K(t) with x∈$R^m$, L(x)∈$R^{m \times n}$, u∈$R^n$, and K(t)⊂$R^m$ where λ is a gain factor and is greater than zero and $A(K)^+$ is the Moore-Penrose pseudo-inverse of A(K) defined by:

$$A(K) = \int_K d_{\hat{k}}^2(x)\sum_{i=1}^{3}\frac{\partial L_i}{\partial x_i}dx + \quad (24)$$

-continued
$$2\int_K [x-\Pi_{\hat{K}}(x)]^T L(x) dx - 2\int_K [x-\Pi_{\hat{K}}(x)]^T L(\Pi_{\hat{K}}(x)) dx,$$

and $L_i$(i=1, 2, . . . m) are the m row vectors in the matrix L.

Figure 8:
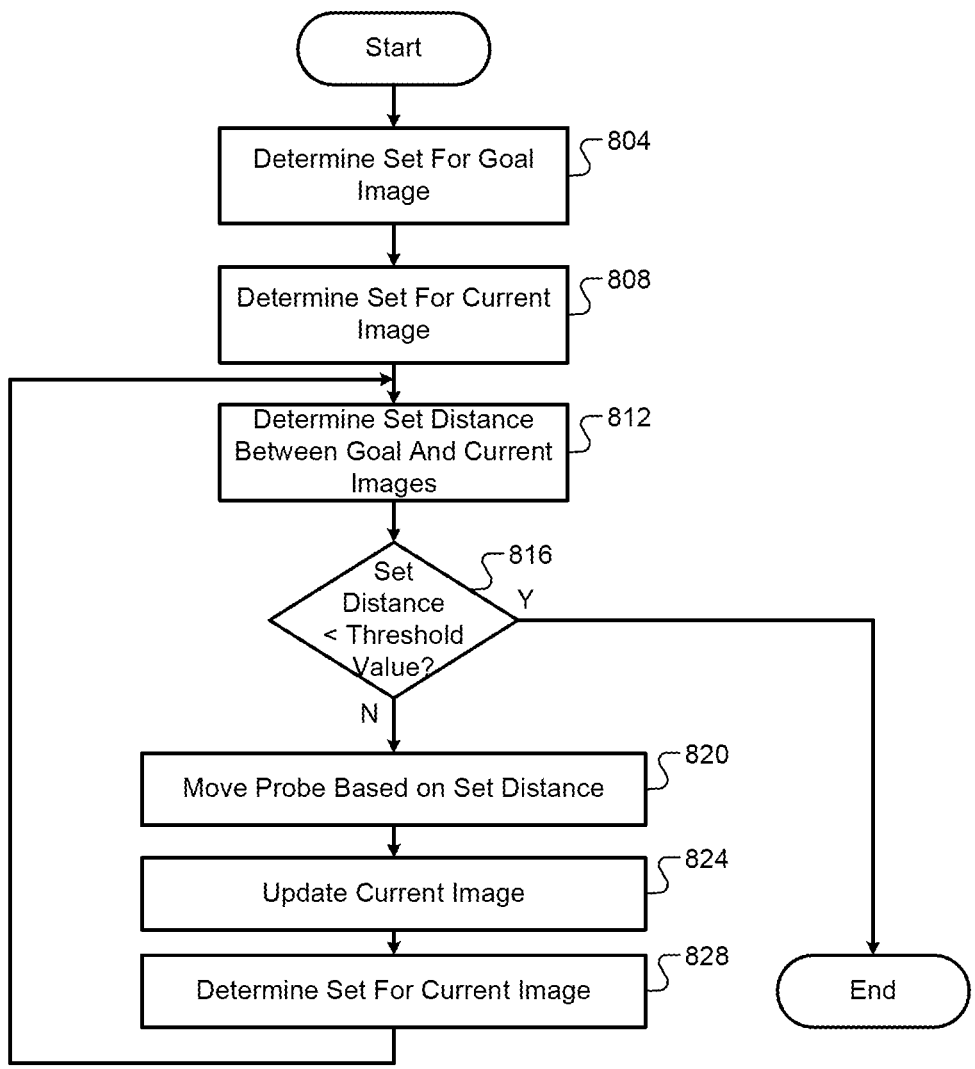
FIG. 8 includes a flowchart depicting an example method of controlling movement of a probe when a current location of the probe is sufficiently close to a desired location according to the present disclosure.

Referring now to FIG. 8, a flowchart depicting an example method of controlling movement of the probe when the current location of the probe is sufficiently close to the desired location is presented. Control may begin with 804 where control determines the set of points (K) for the goal image 650, where the set of points may be chosen randomly from inside the image (e.g., 800 points). The position and intensity of each point is recorded to form a set. At 808, control may determine the set of points (K(t)) for the current image 232. Control determines the Set distance 658 between the current and goal images 232 and 650 at 812 based on the sets of points for the current and goal images 232 and 650.

At 816, control may determine whether the Set distance 658 is less than the threshold value. If true, control may end. If false, control may continue with 820. At 820, control may control movement of the probe based on the Set distance 658. More specifically, control may set the control signal 208 based on the Set distance 658 and the AFM controller 148 may move the probe based on the control signal 208.

At 824, once the probe has moved based on the Set distance 658 from 820, control scans the area of the subject around the current location of the probe using the scanning pattern 212. Once the scanning pattern 212 is complete, control reconstructs the samples of the scanned area of the subject to generate (update) the current image 232 at 824. In some embodiments, reconstruction of the current image is not necessary as will be further described below. Control determines the set of points set of points (K(t)) for the current image 232 at 828, and control returns to 812. Control may continue until movement of the probe drives the Set distance 658 to less than the threshold value.

Figure 9:
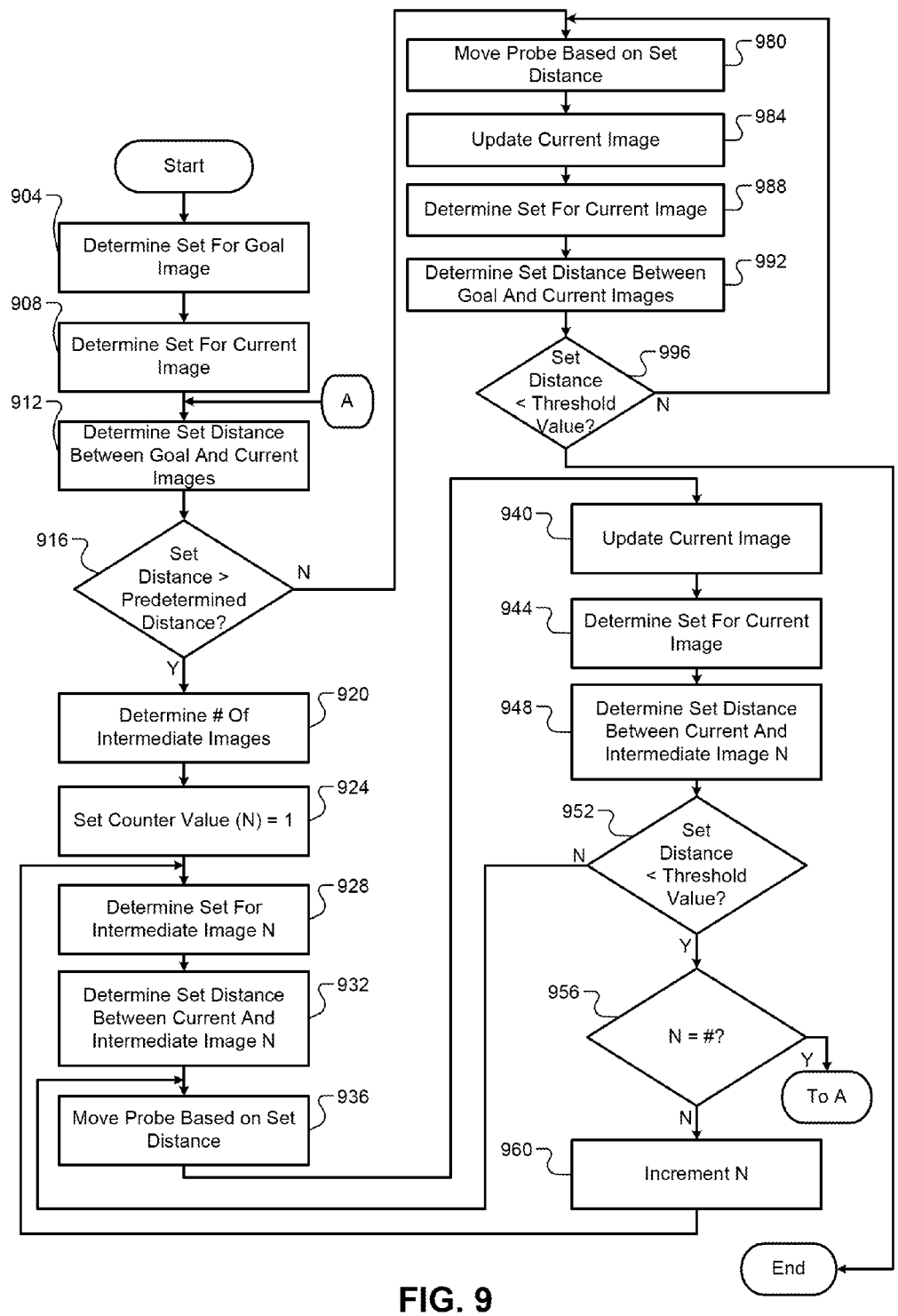
FIG. 9 is a flowchart depicting an example method of controlling movement of a probe according to the present disclosure.

Referring now to FIG. 9, a flowchart depicting an example method of controlling the probe is presented. Control may begin with 904 where control determines the set of points (K) for the goal image 650. At 908, control may determine the set of points (K(t)) for the current image 232. Control determines the Set distance 658 between the current and goal images 232 and 650 at 912 based on the sets of points for the current and goal images 232 and 650.

At 916, control may determine whether the Set distance 658 between the current and goal images 232 and 650 is greater than the predetermined distance. If true, the current location is not sufficiently close to the desired location, and control may continue with 920. If false, the current location is sufficiently close to the desired location, and control may transfer to 980, which is discussed further below.

At 920, control may determine a number of intermediate images for achieving the goal image 650. The number of intermediate images may be an integer that is greater than or equal to one. Control may set a counter value (N) equal to one at 924. In this manner, the value of the counter tracks which one of the one or more intermediate images to target.

Control may determine the set of points (K) for the N-th intermediate image at 928. Control determines the Set distance 658 between the current image 232 and the N-th intermediate image at 932 based on the sets of points for the current image 232 and the N-th intermediate image. At 936, control may control movement of the probe based on the Set distance 658. More specifically, control may set the control signal 208 based on the Set distance 658 and the AFM controller 148 may move the probe based on the control signal 208.

At 940, once the probe has moved based on the Set distance 658 from 932, control scans the area of the subject around the current location of the probe using the scanning pattern 212. Once the scanning pattern 212 is complete, control reconstructs the samples of the scanned area of the subject to generate (update) the current image 232 at 940. Again, reconstructing the current image is not necessary.

Control determines the set of points set of points (K(t)) for the current image 232 at 944. At 948, control determines the Set distance 658 between the current image 232 (determined at 944) and the N-th intermediate image at 932 based on the sets of points for the current image 232 and the N-th intermediate image. Control determines whether the Set distance 658 is less than the threshold value at 952. If true, control may continue with 956. If false, control may return to 936 and continue with 936-952 until movement of the probe drives the Set distance 658 to less than the threshold value.

At 956, control determines whether the counter value (N) is equal to the number of intermediate images determined at 920. If true, control return to 912 and proceed toward achieving the goal image. If false, control may increase the counter value (N) at 960 and return to 928 and proceed with achieving the N-th one of the intermediate images.

Referring back to 980, when the Set distance 658 between the current image 232 and the goal image 650 is less than the predetermined distance, control moves the probe based on the Set distance 658 between the current and goal images 232 and 650 at 980. At 984, once the probe has moved based on the Set distance 658 between the current and goal images 232 and 650, control scans the area of the subject around the current location of the probe using the scanning pattern 212. Once the scanning pattern 212 is complete, control reconstructs the samples of the scanned area of the subject to generate (update) the current image 232 at 984. Again, reconstructing the current image is not necessary.

At 988, control determines the set of points set of points (K(t)) for the current image 232. Control determines the Set distance 658 between the current image 232 (determined at 988) and the goal image 650 at 992 based on the sets of points for the current image 232 and the goal image. Control determines whether the Set distance 658 is equal to zero at 996. If true, control may end. If false, control may return to 980 and continue with 980-996 until movement of the probe drives the Set distance 658 to less than the threshold value.

The non-vector space control method set forth above is computation intensive if the cardinalities of image sets are large. This is because the controller requires the establishment of a set distance that usually needs a large amount of computation. The problem can be alleviated by data reduction of the feedback image. The compressive sensing technique provides an efficient data reduction method to retain the essential information in the original image. In another aspect of this disclosure, an additional control system is developed by utilizing the feedback produced by compressive sensing. This new feedback method is referred to as compressive feedback.

Figure 10:
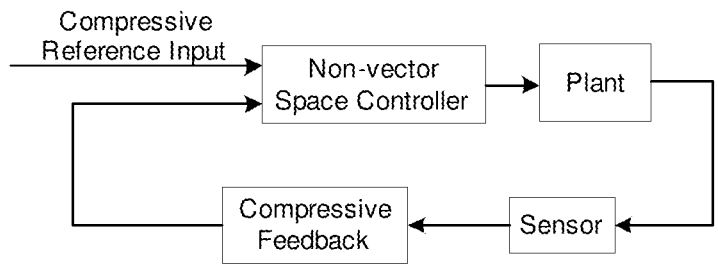
FIG. 10 is a block diagram depicting a non-vector space control method with compressive feedback.

FIG. 10 depicts the structure of the non-vector space control with compressive feedback. A reference input is given in the form of compressive representation. Then based on the current compressive feedback, the non-vector space controller will generate a control signal to correct the error between the reference input and the compressive feedback. In this structure, assume that the sensor can obtain the compressive feedback without noise, i.e., the sensor is ideal and can reflect the true signal from the plant. The controller discussed above is based on the full feedback when all the information in the set K(t) is available. Under the framework of compressive sensing, it is interesting to see what will happen if the compressive feedback is used instead of the full feedback.

Without loss of generality, suppose both k and $\hat{K}$ are finite sets of one dimensional signal. Further assume both k and $\hat{K}$ have a cardinality n. For instance, in visual servoing, the sampled images usually have the same size as the camera resolution. Define a vector with all the set elements from both k and $\hat{K}$ as $x \in \Re^n$ and $\hat{x} \in \Re^n$, respectively. Therefore, we have:

$$x_i = L(x_i)u (i=1,2,\ldots,n)$$

Suppose the feedback x and the desired $\hat{x}$ are projected to lower dimension vectors $y \in \Re^m$ and $\hat{y} \in \Re^m$ through a matrix $A \in \Re^{m \times n}$; that is: $y=Ax$, $\hat{y}=A\hat{x}$. Denote the sets corresponding to y and $\hat{y}$ as $K_c$ and $\hat{K}_c$. where $K_c$ and $\hat{K}_c$ be the current compressive feedback set and the desired compressive feedback set. Based on the above conditions, if L(x) is linear in x(t), then the following controller can locally exponentially stabilize $K_c$ at $\hat{K}_c$:

$$u(t) = \gamma(K_c(t)) = -\alpha \frac{A(K_c)}{A^T(K_c)A(K_c)} V(K_c) \qquad (25)$$

with $A(K_c)$ obtained from Eq. (24) by replacing K and $\hat{K}$ with $K_c$ and $\hat{K}_c$, respectively. $V(K_c)$ is obtained similarly from Eq. (22).

Although we have $dh(K_c, \hat{K}_c) \to 0$ if the controller in Eq. (25) is used, our goal is to steer K to $\hat{K}$ such that $dh(K, \hat{K}) \to 0$. But this goal may not be achievable since there may exist some other set $\tilde{K}$ which, after data compression, can yield the same $\hat{K}_c$. If this is the case, we may have the undesirable result $dh(K, \tilde{K}) \to 0$. We can derive the conditions to guarantee $dh(K, \hat{K}) \to 0$ if $dh(K_c, \hat{K}_c) \to 0$.

Let set K, set $\hat{K}$, set $K_c$ and set $\hat{K}_c$ correspond to $x \in \Re^n$, $\hat{x} \in \Re^n$, $y \in \Re^m$, and $\hat{t} \in \Re^m$ respectively. Moreover, x and y, $\hat{x}$ and $\hat{y}$ are related by $y=Ax$, $\hat{y}=A\hat{x}$. We also state the restricted isometry property as follows. RIP condition: A matrix $A \in \Re^{m \times n}$ with m<n satisfies the restricted isometry property (RIP) of order S if there exists a constant $0 < \delta_S < 1$ such that for any S-sparse vector, we have: $(1-\delta_S)\|x\|_2^2 \leq \|Ax\|_2^2 \leq (1+\delta_S)\|x\|_2^2$.

With the RIP condition, we can derive the condition for the case when the signals are S-sparse. In fact, assuming both $x \in \Re^n$ and $\hat{x} \in \Re^n$ are S-sparse. Moreover, matrix A satisfies the RIP condition with order 2S, we then have $dh(K, \hat{K}) \to 0$ if $dh(K_c, \hat{K}_c) \to 0$.

In reality, the exact sparse signals rarely exist, but most of them obey the so-called power law decay. Suppose a signal $x \in \Re^n$ is rearranged such that $|x_1| \leq |x_2| \leq \ldots \leq |x_n|$. If $|x_n| < Ri^{-1}$ with R a constant, then the signal has the power law decay. It is noted that the exponent for i can be any other negative real numbers, but the number $-1$ is chosen here for simplicity. The signals obeying the power law decay can be approximated by their S-sparse approximations quite well. In fact, for any $x \in \Re^n$, we have: $\|x-x_S\|_2 \leq RS^{-0.5}$. Suppose both x and $\hat{x}$ obey the power law decay. If matrix A satisfies RIP with order n and constant $\delta_n$, then if $dh(K_c, \hat{K}_c) \to 0$, we have:

$$dh(K,\hat{K}) \leq 2\sqrt{2}R(\sqrt{1+\delta_n}+1-\delta_n)/\sqrt{n(1-\delta_n)} \qquad (26)$$

The previous research on the non-vector space control mainly focus on the stabilizing controller with ideal feedback. However, in the natural environment the measurement of pixel intensity is always corrupted by strong noises, which may lead to the instability of the existing controlled system. Thus, how to design a robust controller based on the set space to damp out noises becomes more important. Furthermore, in the mutation analysis, the Hausdorff distance is defined to describe the distance between two sets; however, this metric distance doesn't have a vectorial structure, so it cannot be easily used to describe the noise item between evaluation output and measurement output, then the robust control problem based on set space is difficult to formulate. Hence, it needs to define a set difference which can represent a vectorial difference between two sets and also be used to describe the noise item added on a set.

Figure 11:
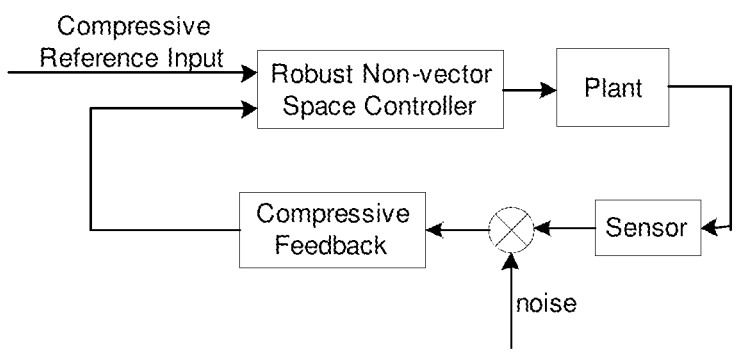
FIG. 11 is a block diagram depicting a non-vector space control method having compressive feedback with noise.

FIG. 11 depicts the structure of the non-vector space control when the feedback is corrupted by noise. As shown in the figure, the compressive feedback with noise. In this case, how to design a controller that is robust to the disturbance will be a problem. Consider two sets $x \subset \Re^n$ and $y \subset \Re^n$, The set difference from set Y to set X is:

$$d_S(X,Y) = \int_X [x - \Pi_y(x)] dx - \int_Y [x - \Pi_X(x)] dx \quad (27)$$

For the controlled mutation system $\overset{o}{K}(t) \ni f(K(t),u(t))$ with the current set K(t) and a desired set $\hat{K}$ let the set difference $z_{dS} = d_S(K,\hat{K})$ be an evaluation output in the set space. $K_\omega(t)$ is defined to be the measured current image set with set noise, and then let the set difference $y_{dS} = d_S(K_\omega, \hat{K})$ be a measured output in the set space; the set noise item $\omega_{dS}$ is defined by $$\omega_{dS} = y_{dS} - z_{dS} \quad (28)$$

Assume a controlled system $\overset{o}{K}(t) \ni f(K,u)$ with a desired set $\hat{K}$ in the neighborhood of an initial set $K_0$. Design a robust controller $u(K_\omega(t))$ based on the measured current set $K_\omega(t)$ such that the inequality below is satisfied:

$$\|z_{dS}\|_2 \leq \gamma \|\omega_{dS}\|_2 + \xi_0 \quad (29)$$

where, $\gamma$ and $\beta_0$ fare nonnegative constants.

For the system in nanomanipulations $\overset{o}{K}(t) \ni \phi(x) = L(\bullet) \cdot u$ ($K_\omega(t)$), the stability for a desired set $\hat{k}$ can be achieved by the following controller; meanwhile inequality (29) is satisfied with $\gamma \to 1$ $$u = -\beta L^+ y_{dS} \quad (30)$$

where $L^+$ is the Moore-Penrose pseudoinverse of L, and $\beta > 0$ is a gain factor. In other words, this controller has the robustness and can reject the disturbance coming from the measurements.

Figure 12:
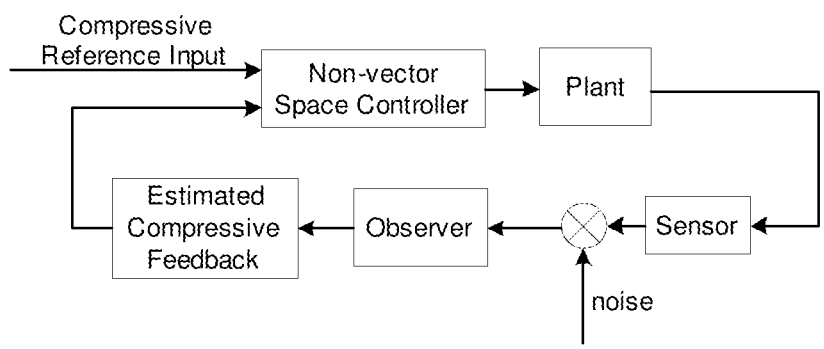
FIG. 12 is a block diagram depicting a non-vector space control method with an observer.

Besides the robust controller, we can also design an observer to estimate the state from the noisy measurements, and then use the estimated state for feedback control. The general idea is shown in FIG. 12. From the figure, an observer is added to estimate the compressive feedback, and the output of the observer is feedback to the non-vector space controller. With the observer, we can show that the original controller in Eq. (23) can still stabilize the system at a desired set. The specific form of the observer can be, for example, a Kalman filter. Other types of observers are also contemplated by this disclosure.

For compressive sensing, the measurement matrix is an essential part due to the relationship between the measurement matrix and measurement efficiency. Properly designed measurement matrix usually lead to fewer measurements but high quality reconstruction image. However, the challenge in compressive sensing in AFM is how to implement measurement matrix onto AFM scan trajectory. The physical meaning of measurement matrix in this application is the AFM tip scanning trajectory. Because of the special working principle of AFM which uses a sharp tip to scan on top of sample surface line by line, it is really hard to use conventional random measurement matrix which samples random points in the entire sample surface simultaneously. Instead of random measurement matrix, continue and smooth AFM trajectory represented by measurement matrix might be an alternative choice. Therefore some special designed measurement matrixes have been studied in previous research (as shown in FIG. 3). Although each one of these matrixes has a good performance on data sampling and image recovery for the AFM sample surface, one potential drawback of these measurement matrixes is that none of them is random. From the view of the Restricted Isometry Property (RIP), these measurement matrixes cannot guarantee all the information of original image to be totally reconstructed. In this section, we re-design the measurement matrix which is a random sampling matrix when it associates with Fourier or wavelet basis, it satisfies the conditions of RIP. The original image can be fully reconstructed.

The working principle of AFM is using a sharp tip to scan line by line on top of sample surface. Therefore a continuous trajectory which will cover all the random points should be developed. It is the typical traveling salesman problem (TSP) which is NP-hard. Before solving this problem, several conditions must be satisfied-AFM tip must scan each point exactly once and finally return to the starting point as shown, for example in FIG. 3D.

One important thing should be noted here, for compressive sensing, it has two basic constraints: first, the measurement matrix should satisfy the RIP condition; second, the observed signal should be sparse. For this application, neither of them could be satisfied. Good thing is we can find one basis $\psi$ which could transform the non-sparse signal in time domain into frequency domain (as mentioned in previous section). About the first constraint, once we apply the basis $\psi$ the new measurement matrix becomes $\tilde{\Phi} = \Phi\psi$ which satisfies the RIP and implies that we randomly sampled in time domain but reconstruct the image in frequency domain and finally transfer it back to time domain. For example, if we set $\psi$ as the Fourier basis associated with our random scanning measurement matrix, the $\tilde{\Phi}$ satisfies RIP condition.

Through the theoretical analysis, this sampling method could deal with the condition when the signal is sparse in frequency domain. If the signal is not sparse in frequency domain, in other words, if the observed image is sparse in time domain, this sampling method might not guarantee the observed image can be well sampled and exactly reconstructed. Actually, for AFM that based manipulations and observations, the observed image is quite possible to be sparse in time domain. According to uncertainty principle, if the signal is sparse in frequency domain, it cannot be sparse at time domain. In this case the random sampling in time domain might not cover all the topography information.

Figure 13:
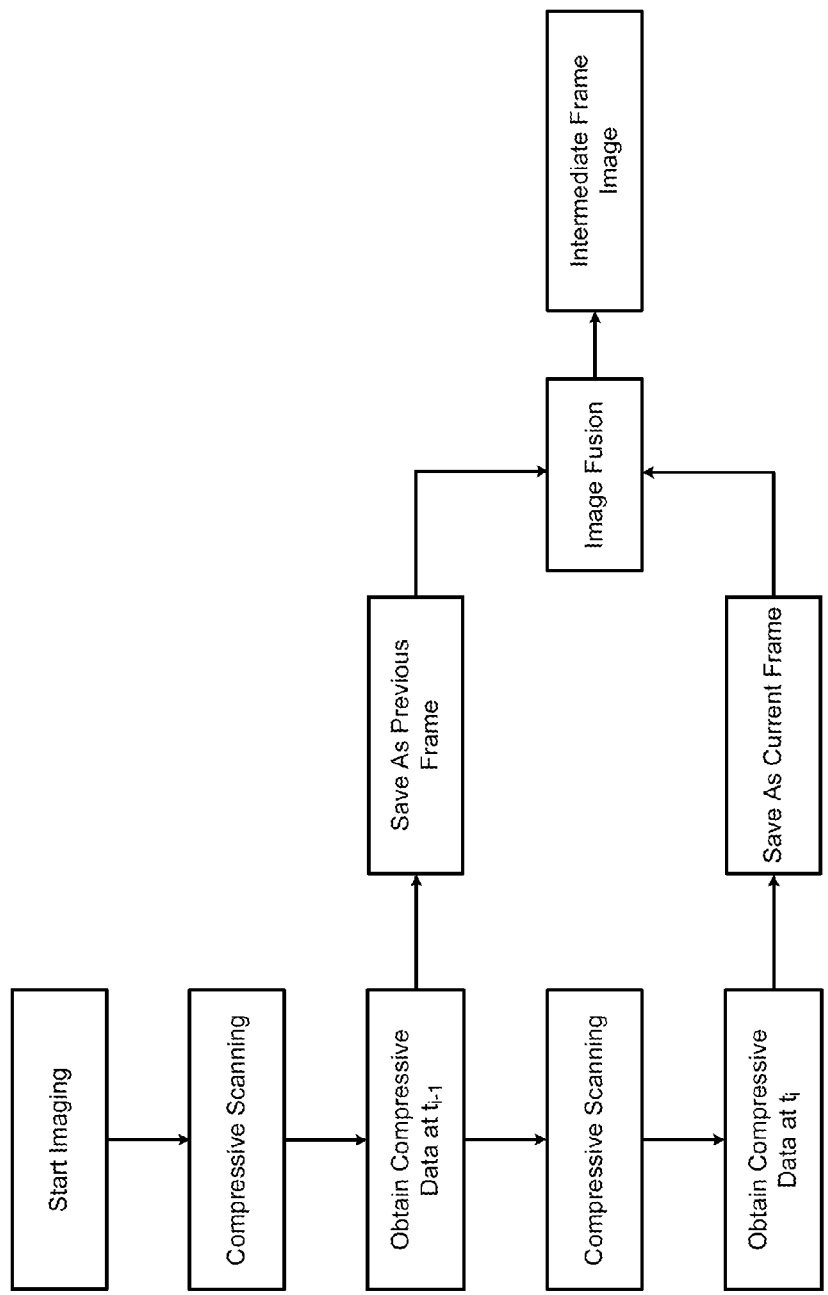
FIG. 13 is a flowchart illustrating a prior knowledge based video rate imaging approach.

One solution of this issue is to build up a prior knowledge based compressive scan strategy as shown in FIG. 13. In the dynamic observation, AFM continuously scans and observes the dynamic change of sample surface. In this case we can develop an approach to design the measurement matrix base on previous frame information, and simultaneously use the information of previous frame as a part of current measurements. Now, the problem becomes how to use the previous information and how to design the new measurement matrix for the current frame.

For continuously observation, if the capture frequency is higher than nanoparticle dynamic change frequency, we can assume that the image in time $t_i$ is similar with the previous one $t_{i-1}$.

$$\|x_{t_i} - x_{t_{i-1}}\|_2 \leq \gamma \tag{31}$$

where $\gamma$ is a positive number. In this case, we can further assume that for current frame $x_{t_i}$, it consists of two parts among which one is from previous frame $x_{t_{i-1}}$ and the other one is from current sampling $\Phi_{t_i} x_{t_i}$.

$$x_{t_i} \approx \Phi_{t_{i-1}} x_{t_{i-1}} \ominus \Phi_{t_i} x_{t_i} = \bar{x}_{t_i} \tag{32}$$

where $\Phi_{t_{i-1}}$ and $\Phi_{t_i}$ are the measurement matrixes of $x_{t_{i-1}}$ and $x_{t_i}$ respectively. In words, they could be considered as the projection matrixes which $\Phi_{t_i} \in \mathfrak{R}^{M \times N}$: $\mathfrak{R}^N \to \mathfrak{R}^M$ and $\Phi_{t_{i-1}} \in \mathfrak{R}^{(N-M) \times N}$: $\mathfrak{R}^N \to \mathfrak{R}^{(N-M)}$.

In Eq. (32), $\Phi_{t_i} x_{t_i}$ is the random sampling results of current frame image. Because the length of this measurements is M which M<N, it still needs the information about the other (N-M) elements information to construct current frame image. For these missing elements, we use previous frame information to fill in the blanks to generate $\bar{x}_{t_i}$. However, this $\bar{x}_{t_i}$ could not be used directly as the current frame image, and this is because these two parts of data from different frames cannot merge themselves automatically.

Another compliant and predict process is needed for further estimating the current frame image $\bar{x}_{t_i}$. Here, the compressive sensing based on Bernoulli random measurement matrix and minimization total variation algorithm are used to estimate the $\bar{x}_{t_i}$.

$$y_{t_i} = \Phi_{Bernoulli} \bar{x}_{t_i} \tag{33}$$

$$\bar{x}_{t_i} = \arg \min TV(\bar{x}_{t_i}) \text{ s.t } y_{t_i} = \Phi_{Bernoulli} \bar{x}_{t_i} \tag{34}$$

where $$TV(x) = \Sigma_{i,j} \sqrt{(x_{i+1,j} - x_{i,j})^2 + (x_{i,j+1} - x_{i,j})^2}$$

After this further sampling and reconstruction process, the recovered current frame image $\hat{x}_{t_i}$ has been obtained. Because of applying the minimization total variation algorithm, the recovered image could achieve a gradient continuous. In this case the $\hat{x}_{t_i}$ could become sharp and smooth. Two important things should be noted here. First one is the physical meaning of $\hat{x}_{t_i}$. Here $\hat{x}_{t_i}$ is reconstructed by both the current frame $x_{t_i}$ and previous frame $x_{t_{i-1}}$. Therefore, the recovered current frame image $\hat{x}_{t_i}$ represent the frame between $t_{i-1}$ and $t_i$. Here we use this inter-frame to approximate the current frame image. Consider a dynamically continuous observation, assume that the first frame of image we have already got and through above approach we random sampled at time $t_i$, where i=1, 2, ..., n and recovered the images at the time $t_{i-\delta}$, where i=1, 2, ..., n and $\delta \subset (0,1)$. The value of parameter $\delta$ depends on the number of random sampling. In other words, if random samples have N/2 measurements, the value of $\delta$ should around 0.5. Second one is about the random measurement matrixes $\Phi_{t_i} x_{t_i}$ and $\Phi_{Bernoulli}$. Both of them should be redesigned for each frame. These processes try to achieve an independent and uniform sampling which will cover the entire image across several frames.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

What is claimed is:

1. A method of producing video rate images of a subject, comprising:
    moving a tip of a scanning probe microscope over an area of the subject;
    generating a first signal based on a position of the tip during the movement;
    selectively sampling the first signal during the movement;
    generating a first image of the area of the subject using the samples taken during the movement of the tip over the area of the subject;
    moving the tip over part of the area of the subject at a rate that corresponds to producing video rate images,
    wherein the movement of the tip over part of the area of the subject is performed following a predetermined scanning pattern;
    generating a second signal based on the position of the tip during the movement over part of the area of the subject;
    selectively sampling the second signal generated during the movement of the tip over part of the area of the subject;
    generating a second image of the area of the subject from the samples taken during the movement of the tip over part of the area of the subject, where the second image is generated based in part on the first image and the predetermined scanning pattern and using a total variation minimization norm function; and displaying the second image.

2. The method of claim 1 further comprising reconstructing the second image from the samples taken by constraining solution to have a small number of nonzero coefficients.

3. The method of claim 1 further comprising:
determining a first set of points based on a goal image;
determining a second set of points based on the second image;
determining a distance between the first and second sets; and
moving the tip based on the distance.

4. The method of claim 3 wherein the distance is a Hausdorff distance between the first and second sets.

5. The method of claim 3 further comprising controlling movement of the tip based on driving the distance to less than a threshold value.

6. The method of claim 5 further comprising, after the moving of the tip based on the distance:
moving the tip over part of the area of the subject, following the predetermined scanning pattern during a period;
generating a third signal based on the position of the tip during the movement over part of the area of the subject during the period;
sampling the third signal generated during the movement of the tip over part of the area of the subject during the period;
generating a third image of the area of the subject using the samples taken during the movement of the tip over part of the area of the subject during the period; and
refreshing the display to display the third image.

7. The method of claim 6 further comprising, after the movement of the tip along the predetermined scanning pattern during the period:
determining the first set of points based on the goal image;
determining the second set of points based on the third image;
determining the distance between the first and second sets; and
moving the tip based on the distance.

8. The method of claim 1 wherein the predetermined scanning pattern includes equally spaced horizontal or vertical lines for the movement of the tip.

9. The method of claim 1 wherein the predetermined scanning pattern includes concentric rectangles for the movement of the tip.

10. The method of claim 1 wherein the predetermined scanning pattern includes a saw tooth pattern.

11. The method of claim 1 wherein the predetermined scanning pattern includes a random trajectory pattern.

12. A method of producing video rate images of a subject, comprising:
moving a tip of a scanning probe microscope over an area of the subject;
generating a first image of the area of the subject based on a first set of samples of a height of the tip during the movement over the area of the subject;
moving the tip over part of the area of the subject at a rate that corresponds to producing video rate images, wherein the movement of the tip over part of the area of the subject is performed following a predetermined scanning pattern;
generating a second image of the area of the subject based on a second set of samples of the height of the tip during the movement over part of the area of the subject; wherein the second image is generated using the predetermined scanning pattern and a total variation minimization norm function; and
displaying the second image on a display.

13. The method of claim 12 wherein the reconstruction function is a compressive sensing image reconstruction function.

14. The method of claim 12 further comprising:
determining a first set of points based on a goal image;
determining a second set of points based on the second image;
determining a distance between the first and second sets; and
moving the tip based on the distance.

15. The method of claim 14 wherein the distance is a set distance between the first and second sets.

16. The method of claim 14 further comprising controlling movement of the tip based on driving the distance to less than a threshold value.

17. The method of claim 16 further comprising, after the moving of the tip based on the distance:
moving the tip along the predetermined scanning pattern during a period;
generating a third image based on:
a third set of samples of the height of the tip during the movement along the predetermined scanning pattern during the period;
the predetermined scanning pattern; and
the reconstruction function; and
refreshing the display to display the third image.

18. The method of claim 17 further comprising, after the movement of the tip along the predetermined scanning pattern during the period:
determining the first set of points based on the goal image;
determining a third set of points based on the third image;
determining the distance between the first and third sets; and
moving the tip based on the distance.

19. The method of claim 12 wherein the predetermined scanning pattern includes equally spaced horizontal or vertical lines for the movement of the tip.

20. The method of claim 12 wherein the predetermined scanning pattern includes concentric rectangles for the movement of the tip.

21. The method of claim 12 wherein the predetermined scanning pattern includes a saw tooth pattern.

22. The method of claim 12 wherein the predetermined scanning pattern includes a random trajectory pattern.

23. A system for producing video rate images of a subject, comprising:
a control module that drives movement of a tip of a scanning probe microscope over an area of the subject and that, after the movement of the tip over the area of the subject, drives movement of the tip over part of the area of the subject at a rate that corresponds to producing video rate images,
wherein the control module drives movement of the tip over part of the area of the subject following a predetermined scanning pattern;
an imaging module that generates a first image of the area of the subject based on a first set of samples of a height of the tip during the movement over the area of the subject and that generates a second image of the area of the subject based on a second set of samples of the height of the tip during the movement over part of the area of the subject, wherein the second image is generated using the predetermined scanning pattern and a total variation minimization norm function; and a user interface module that displays the second image on a display.

24. The system of claim 23 wherein the reconstruction function is a compressive sensing image reconstruction function.

25. The system of claim 23 wherein the control module further:

determines a first set of points based on a goal image;
determines a second set of points based on the second image;
determines a distance between the first and second sets; and
drives movement of the tip based on the distance.

26. The system of claim 25 wherein the distance is a set distance between the first and second sets.

27. The system of claim 25 wherein the control module further drives the movement of the tip based on driving the distance to less than a threshold value.

28. The system of claim 27 wherein, after the moving of the tip based on the distance:

the control module further drives movement of the tip along the predetermined scanning pattern during a period;
the imaging module further generates a third image based on:
a third set of samples of the height of the tip during the movement along the predetermined scanning pattern during the period;
the predetermined scanning pattern; and
the reconstruction function; and
the user interface module further refreshes the display to display the third image.

29. The system of claim 28 wherein, after the movement of the tip along the predetermined scanning pattern during the period, the control module further:

determines the first set of points based on the goal image;
determines a third set of points based on the third image;
determines the distance between the first and third sets; and
drives movement of the tip based on the distance.

30. The system of claim 23 wherein the predetermined scanning pattern includes equally spaced horizontal or vertical lines for the movement of the tip.

31. The system of claim 23 wherein the predetermined scanning pattern includes concentric rectangles for the movement of the tip.

32. The system of claim 23 wherein the predetermined scanning pattern includes a saw tooth pattern.

33. The method of claim 23 wherein the predetermined scanning pattern includes a random trajectory pattern.

* * * * *

UNITED STATES PATENT AND TRADEMARK OFFICE
CERTIFICATE OF CORRECTION

PATENT NO. : 9,575,307 B2
APPLICATION NO. : 14/384608
DATED : February 21, 2017
INVENTOR(S) : Ning Xi et al.

It is certified that error appears in the above-identified patent and that said Letters Patent is hereby corrected as shown below:

In the Specification

Column 8, Line 18, delete "d(X),Y)" and insert therefor --d(X,Y)--

Column 10, Line 6, delete "$L_i(i=1, 2, \ldots m)$" and insert therefor --$L_i(i=1, 2, \ldots, m)$--

Column 12, Line 42, delete "$\hat{t} \in \Re^m$" and insert therefor --$\hat{y} \in \Re^m$--

Column 12, Line 67, delete "$d_H(K,\hat{K}) \leq 2\sqrt{2}R(\sqrt{1+\delta_n}+1-\delta_n)/\sqrt{n(1-\delta_n)}$" and insert therefor --$d_H(K,\hat{K}) \leq 2\sqrt{2}R(\sqrt{1+\delta_n}+\sqrt{1-\delta_n})/\sqrt{n(1-\delta_n)}$--

Column 13, Line 40, delete "$\|z_{dS}\|_2 \leq \gamma\|\omega_{dS}\|_2 + \xi_0$" and insert therefor --$\|z_{dS}\|_2 \leq \gamma\|\omega_{dS}\|_2 + \beta_0$--

Column 13, Line 44, delete "$\hat{k}$" and insert --$\hat{K}$--

Signed and Sealed this
Sixth Day of June, 2017

Michelle K. Lee
*Director of the United States Patent and Trademark Office*